(12) United States Patent
Fancher

(10) Patent No.: US 7,255,125 B2
(45) Date of Patent: *Aug. 14, 2007

(54) HOUSING FOR GAS REGULATOR AND GAUGES

(75) Inventor: Bob W. Fancher, Emporia, KS (US)

(73) Assignee: PARAgon Holdings LLC, Lawson, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/025,003

(22) Filed: Dec. 29, 2004

(65) Prior Publication Data

US 2005/0109401 A1    May 26, 2005

Related U.S. Application Data

(60) Provisional application No. 10/288,350, filed on Nov. 4, 2002, now Pat. No. 6,886,587.

(51) Int. Cl.
*F16K 27/08* (2006.01)
(52) U.S. Cl. ................. 137/382; 137/315.01; 137/360; 137/554
(58) Field of Classification Search ................ 137/382, 137/315.01, 360, 554, 377
See application file for complete search history.

(56) References Cited

U.S. PATENT DOCUMENTS

| 4,352,370 A | 10/1982 | Childress |
| 5,058,758 A | 10/1991 | Suddeth |
| 5,638,858 A | 6/1997 | Gettinger et al. |
| 5,988,208 A | 11/1999 | Tudhope et al. |
| 6,041,812 A | 3/2000 | Hibers |
| 6,062,254 A | 5/2000 | Brady et al. |

*Primary Examiner*—A. Michael Chambers
(74) *Attorney, Agent, or Firm*—Hovey Williams LLP

(57) ABSTRACT

A housing (10) for mounting on a mounting surface and for supporting and protectively enclosing a regulator (12) and one or more gauges (14,16) associated with providing, controlling, and monitoring a flow of gas from a pressurized gas supply, such as is commonly used, for example, in welding, cutting, and otherwise heating metal. The housing (10) comprises a front (20); a left side (22); a right side (24); a top (26), including a bolt flange (28); a bottom (30); a hinge (32); and a securement mechanism (34). The hinge (32) allows for easy access to the regulator (12) and gauges (14,16) without requiring that the housing (10) be completely removed from the mounting surface. The securement mechanism (34) includes one or more isolation mechanisms (64,68) for reducing or substantially eliminating transmission of potentially accuracy-affecting or otherwise damaging vibrations to the regulator (12) and gauges (14,16).

19 Claims, 3 Drawing Sheets

HOUSING FOR GAS REGULATOR AND GAUGES

RELATED APPLICATIONS

This application is a continuation of and claims priority benefit to U.S. patent application Ser. No. 10/288,350, filed Nov. 4, 2002 now U.S. Pat. No. 6,886,587 entitled HOUSING FOR GAS REGULATOR AND GAUGES, which is hereby incorporated into the present application by reference.

BACKGROUND OF THE INVENTION

1. Field of the Invention

The present invention relates broadly to housings for protecting regulators and gauges associated with pressurized gas supplies. More particularly, the present invention concerns a housing for supporting and protectively enclosing a regulator and one or more gauges associated with providing, controlling, and monitoring a flow of a gas from a pressurized gas supply, such as is commonly used, for example, in welding, cutting, or otherwise heating metal, wherein the housing is both modular and hingedly mounted for ease of use.

2. Description of the Prior Art

It is often desirable to transport pressurized gas supplies, such as, for example, conventional gas cylinders, by a truck or similar vehicle for use onsite to weld, cut, or otherwise heat metal. Typically, a regulator is provided to stop, start, and otherwise control a flow of a gas from the gas supply, and one or more gauges are provided for monitoring the flow. The regulator and gauges must be mounted so as to be both conveniently accessible for use and visibly monitorable during use. Furthermore, it will be appreciated that it is highly desirable to protect the regulator and gauges from damage, particularly from damage which could affect their accuracy.

In the prior art, it is well-known to provide a housing for protectively enclosing the regulator and the gauges. Typically, the regulator and gauges mount within or behind the housing and the housing itself mounts upon a surface of the truck or other vehicle. Unfortunately, prior art housings suffers from a number of disadvantages, including, for example, that accessing the regulator or gauges for maintenance, leak testing, or other purposes is substantially inconvenient, requiring that the housing be completely dismounted. Furthermore, where two or more different gases and gas supplies are used, such as, for example, when welding or cutting metal using both oxygen gas and acetylene gas, a corresponding number of housings must be separately mounted to the vehicle, thereby undesirably requiring, for example, that twice as many mounting holes be drilled into the mounting surface. Additionally, because the regulator and gauges are mounted to the housing and the housing is mounted to the vehicle, vibrations and impacts are often undesirably transferred from the vehicle to the regulator and gauges, thereby potentially resulting in decreased accuracy or other damage.

Due to these and other problems and disadvantages in the prior art, a need exists for an improved housing for protectively enclosing the regulator and gauges.

SUMMARY OF THE INVENTION

The present invention is a distinct advance in the art of housings for supporting and enclosing regulators and gauges associated with pressurized gas supplies. More particularly the present invention provides a housing for mounting on a mounting surface and for supporting and protectively enclosing a regulator and one or more gauges associated with providing, controlling, and monitoring a flow of gas from a pressurized gas supply, such as is commonly used, for example, in welding, cutting, and otherwise heating metal.

In a preferred embodiment, the housing broadly comprises a front; a left side; a right side; a top, including a bolt flange; a bottom; a hinge; and a securement mechanism. The front, left and right sides, top, and bottom are all constructed of heavy gauge powder-coated steel. The front is operable to support and frontally protect the regulator and gauges, and presents a regulator hole and two gauge holes through which the mounted regulator and gauges can be seen and monitored during use.

The left side and the right side cooperate to support and space the front from the mounting surface and to further protect the regulator and gauges. The left and right sides each present one or more hose holes or openings and one or more keyhole slots. The hose openings allow a first hose to enter the housing and a second hose to exit the housing. The keyhole slots provide a mechanism for supporting and retaining a connector end of the second hose or a working device connected thereto during periods of non-use.

The top aids in mounting the housing to the mounting surface and in further protecting the regulator and gauges. As it is often desirable to use multiple gas supplies, and doing so requires a corresponding number of housings, the top provides a number of top bolt holes for coupling the top of one housing to the bottom of another housing, thereby making the housing advantageously modular. The bolt flange projects rearwardly and upwardly from a rearmost edge of the top, and presents a bolt opening operable to removably receive a bolt for securing the top to the mounting surface.

The bottom aids in mounting the housing to the mounting surface and in further protecting the regulator and gauges. The bottom provides a number of bottom bolt holes for attaching the hinge. The bottom bolt holes are aligned with the top bolts holes so that, with the hinge removed, the bottom of one housing can be coupled with the top of another housing so that the two housings form a single unit. The hinge is a substantially conventional hinge structure. With the bolt removed from the bolt flange of the top of the housing, the housing can be pivoted about the hinge and lowered to allow for accessing the regulator and gauges while remaining attached to the mounting surface by the hinge.

The securement mechanism is operable to safely secure the regulator and gauges within the protective enclosure formed by the front, the left and right sides, the top, and the bottom. The securement mechanism includes a forward isolation mechanism in the form of a large O-ring; a mounting plate; and a rear isolation mechanism in the form of a small O-ring. The large forward O-ring is interposed between the front and a face portion of the regulator so as to prevent the transmission of vibrations or impacts therebetween. The mounting plate is operable to removably secure the regulator to the front. The small rearward O-ring is interposed between the mounting plate and a rear portion of the regulator so as to prevent the transmission of vibrations or impacts therebetween.

Thus, it will be appreciated that the housing of the present invention provides substantial advantages over the prior art, including, for example, that the housing is hingedly mounted so as to facilitate easier and more convenient access to the enclosed regulator and gauges without requiring that the housing be completely dismounted. Furthermore, the housing is advantageously modular, allowing multiple housings to be attached to one another to form an integral unit, with the unit, rather than the individual housings, being then mounted to the vehicle. Thus, if N number of bolts are required to mount a single housing, and it is desired to mount M number of housings, then the present invention continues to require only N number of bolts and bolt holes while the prior art requires (N×M) number of bolts and bolt holes. Thus, the present invention reduces the complexity of and labor involved in mounting multiple housings, and reduces the number of holes which must be provided in the mounting surface. Additionally, the shock-absorbing isolation mechanisms of the securement mechanism advantageously protect the regulator and gauges from exposure to potentially damaging or accuracy-affecting vibrations and impacts which might otherwise be transmitted via the housing.

These and other important aspects of the present invention are more fully described in the section entitled DETAILED DESCRIPTION, below.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENT

Figure 1:
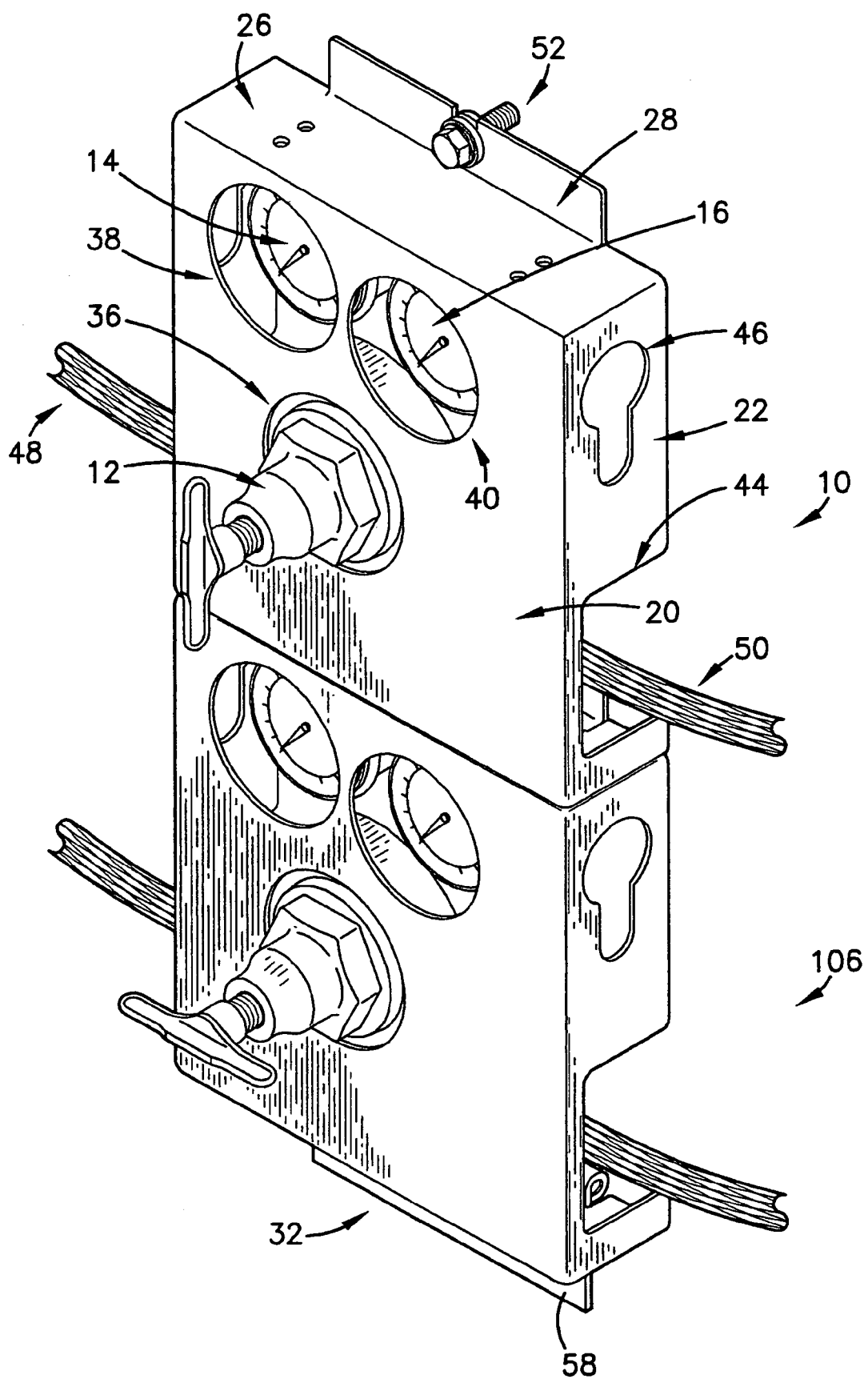
FIG. 1 is an isometric view of a preferred embodiment of the housing of the present invention, wherein two instances of the housing are vertically joined for convenient mounting.
Figure 2:
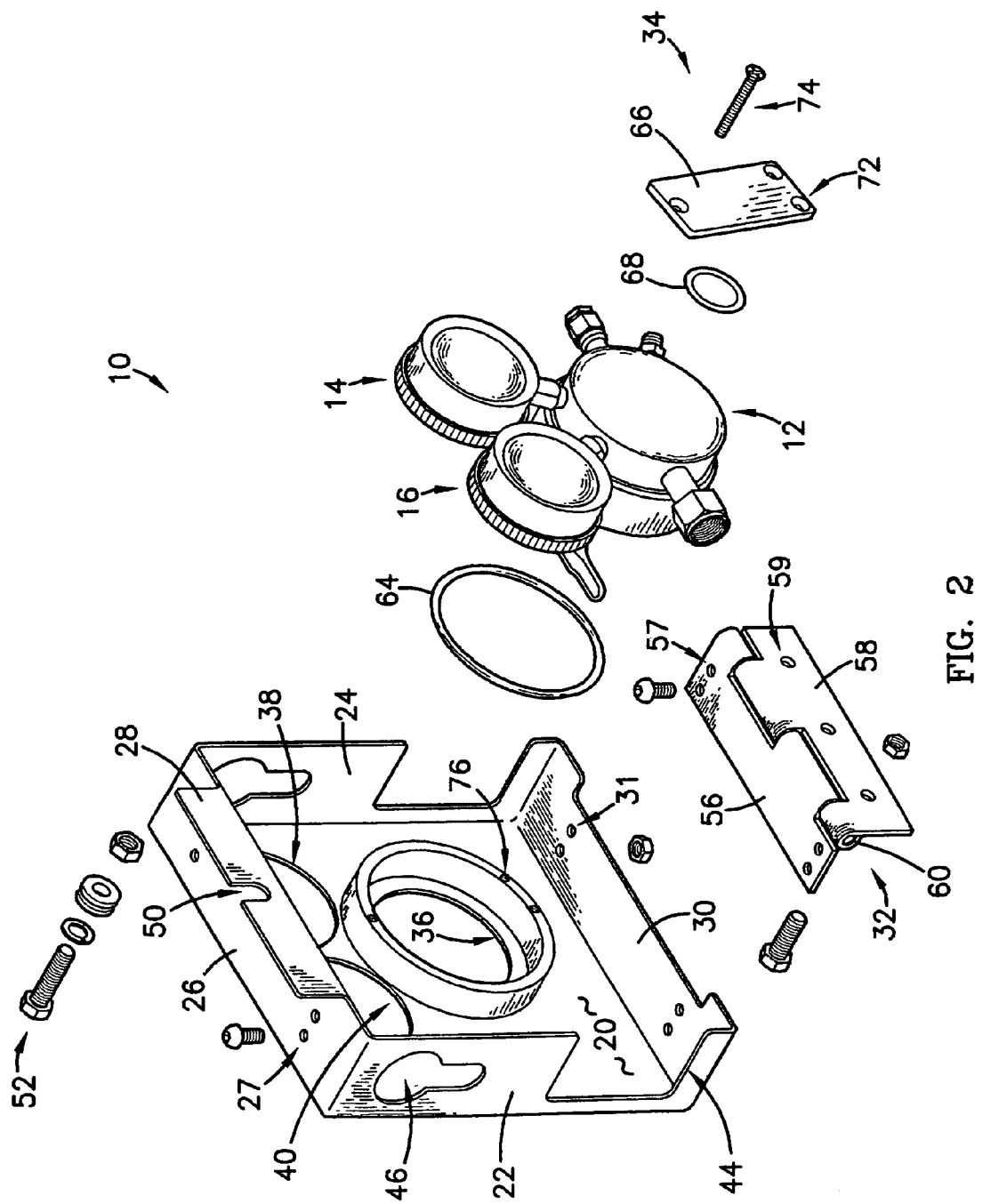
FIG. 2 is an exploded view of the housing of FIG. 1.

Referring to the figures, a housing 10 is shown constructed in accordance with a preferred embodiment of the present invention. The housing 10 is operable to protectively enclose a regulator 12 and one or more gauges 14,16 associated with providing, controlling, and monitoring a flow of a gas from a pressurized gas supply. The gas supply may be, for example, a conventional gas cylinder which is commonly used in welding, cutting, or otherwise heating metal. It should be noted that the housing 10 is independent of the regulator 12 and gauges 14,16 which are substantially conventional and commonly available. The housing 10 may be mounted on a vehicle or shop wall or other mobile or stationary mounting surface.

In a preferred embodiment, the housing 10 broadly comprises a front 20; a left side 22; a right side 24; a top 26, including a bolt flange 28; a bottom 30; a hinge 32; and a securement mechanism 34. The front 20 is operable to support and frontally protect the regulator 12 and gauges 14,16. As illustrated, the front 20 is constructed of a substantially square piece of 14 gauge powder-coated steel presenting a regulator hole 36 and two gauge holes 38,40 through which the mounted regulator 12 and gauges 14,16 may be seen and monitored during use. Additional holes may be provided as needed or desired for a particular application.

The left side 22 and the right side 24 cooperate to support and space the front 20 from the mounting surface and to further protect the regulator 12 and gauges 14,16. As illustrated, the left and right sides 22,24 are each substantially identical and constructed of elongated rectangular pieces of 14 gauge powder-coated steel welded to opposing vertical ends of the front 20 so as to project rearwardly therefrom and parallel to one another. The left and right sides 22,24 have sufficient widths to space the front 20 a distance apart from the mounting surface sufficient to accommodate the regulator 12 and gauges 14,16 therebetween.

The left and right sides 22,24 each present one or more hose holes or openings 44 and one or more keyhole slots 46. The hose openings 44 allow a first hose 48 to enter the housing 10 to couple the regulator 12 with the gas supply, and allow a second hose 50 having a connector end to exit the housing 10 to couple the regulator 12 with a wand or other working device. Thus, the hose openings 44 are substantially aligned with corresponding hose connection points on the regulator 12.

The keyhole slots 46 each appear as an upper larger hole overlapping a lower smaller hole. The connector end of the aforementioned second hose 50 may, during periods of non-use, be disconnected from the wand and placed into the upper larger hole portion of the keyhole slot 46 and lowered into the lower smaller hole portion, wherein the dimensions of the lower smaller hole portion are such that the connector end cannot inadvertently fall therefrom. Thus, the second hose 50 may be safely secured until desired for use, at which time the connector end is lifted from the lower smaller hole portion into the upper larger hole portion and then drawn forth therefrom.

The top 26 aids in mounting the housing 10 to the mounting surface and in further protecting the regulator 12 and gauges 14,16. As illustrated, the top 26 is a substantially elongated rectangular piece of 14 gauge powder-coated steel welded to an upper edge of the front 20 and to upper edges of both the left and right sides 22,24 so as to project perpendicularly relative to each of these components and parallel to the bottom 30. The top 26 provides a number of top bolt holes 27 for attaching the top 26 to a bottom of a second housing 10b (as shown in FIG. 1), as described below.

The bolt flange 28 projects rearwardly and upwardly from a rearmost edge of the top 26. The bolt flange 28 presents a bolt hole or opening 50 operable to removably receive a bolt 52 for securing the top 26 to the mounting surface or to the second housing 10b. The bolt flange 28 projects slightly rearwardly from the top 26 in order to accommodate attachment of the second housing 10b, as described below. In alternative embodiments, the bolt flange 28 may be associated with the left or right side 22,24 or with the bottom 30.

The bottom 30 aids in mounting the housing 10 to the mounting surface and in further protecting the regulator 12 and gauges 14,16. As illustrated, the bottom 30 is a substantially elongated rectangular piece of 14 gauge powder-coated steel welded to a lower edge of the front 20 and to lower edges of both the left and right sides 22,24 so as to project perpendicularly relative to each of these components and parallel to the top 26. The bottom 30 provides a number of bottom bolt holes 31 for attaching the hinge 32. The bottom bolt holes 31 are aligned with the top bolts holes 27 so that, with the hinge 32 removed, the bottom 30 of the housing 10 can be coupled with a top of the second housing 10b so that the two housings 10,10b form a single unit.

The hinge 32 is a substantially conventional hinge structure, having a first side 56 and a second side 58 which are pivotably joined about a pivot axis 60. As illustrated, the first side 56 provides a number of bolt holes 57 for receiving bolts for removably attaching the first side 56 to the bottom 30. The second side 58 similarly provides a number of bolt holes 59 for receiving bolts for removably attaching the second side 58 to the mounting surface. The pivot axis 60 is located adjacent and along a rearward edge of the bottom 30. Thus, with the bolt 52 removed from the bolt flange 28, the housing 10 can be lowered to allow for accessing the regulator 12 and gauges 14,16 while remaining attached to the mounting surface by the hinge 32. In alternative embodiments, particularly where the bolt flange 28 is associated with the left or right sides 22,24 or with the bottom 30, the hinge 32 may be associated with, respectively, the right or left side 24,22 or with the top 26. Such alternative embodiments, it will be appreciated, provide many of the same advantages as the illustrated embodiment.

The securement mechanism 34 is operable to safely secure the regulator 12 and gauges 14,16 within the protective enclosure formed by the front 20, the left and right sides 22,24, the top 26, and the bottom 30. The securement mechanism 34 includes a forward isolation mechanism in the form of large a O-ring or gasket 64; a mounting plate 66; and a rear isolation mechanism in the form of a small O-ring or gasket 68. The large forward O-ring 64 is substantially conventional, being constructed of rubber or a similar vibration and impact-dampening or absorbing material, and is interposed between the front 20 and a face portion of the regulator 12 so as to prevent the transmission of vibrations or impacts therebetween.

The mounting plate 66 is operable to removably secure the regulator 12 to the front 20. As illustrated, the mounting plate 66 is a substantially elongated rectangular piece of metal having one or more bolt holes 72. The bolt holes 72 are spaced apart a distance greater than the diameter of the regulator 12 so that bolts 74 inserted through the bolt holes 72 extend past the regulator 12 to the front 20 and couple therewith, thereby removably clamping the regulator 12 between the mounting plate 66 and the front 20. Provision, in the form of a threaded recess 76 or bolt hole, is made on or in the front 20 to receive the bolts 74.

The small rearward O-ring 68 is substantially conventional, being constructed of rubber or a similar vibration and impact-dampening or absorbing material, and is interposed between the mounting plate 66 and a rear portion of the regulator 12 so as to prevent the transmission of vibrations or impacts therebetween. Thus, the regulator 12, and the gauges 14,16 coupled therewith, are effectively isolated by the large forward and small rearward O-rings 64,68 from potentially damaging or accuracy-affecting vibrations and impacts which might otherwise be transmitted via the housing 10 or the mounting plate 66.

In exemplary use and operation, the large forward O-ring 64 of the securement mechanism 34 is positioned about the regulator hole 36 cut into the front 20. Next, a face portion of the regulator 12 is placed against the large forward O-ring 64 and the small rearward O-ring 68 is positioned on a rear portion of the regulator 12. The mounting plate 66 is placed against the small rearward O-ring 68 and the bolts 74 are inserted through the holes 72 in the mounting plate and threaded into the threaded recesses 76 provided on the front 20. Thus is the regulator 12, with the gauges 14,16 attached thereto, securely coupled with the housing 10.

Next the housing 10 is placed against the pre-drilled mounting surface and bolts are used to secure the second side 58 of the hinge 32 thereto. Lastly, the bolt 52 is inserted through the bolt hole 50 of the bolt flange 28 of the top 26 and tightened. Thus is the housing 10 secured to the mounting surface so as to support and protectively enclose the regulator 12 and gauges 14,16.

Should it thereafter become necessary to access the regulator 12 or gauges 14,16 for maintenance, leak testing, or other reasons, the bolt 52 is removed and the housing 10 is lowered by pivoting it about the pivot axis 60 of the hinge 32.

Figure 3:
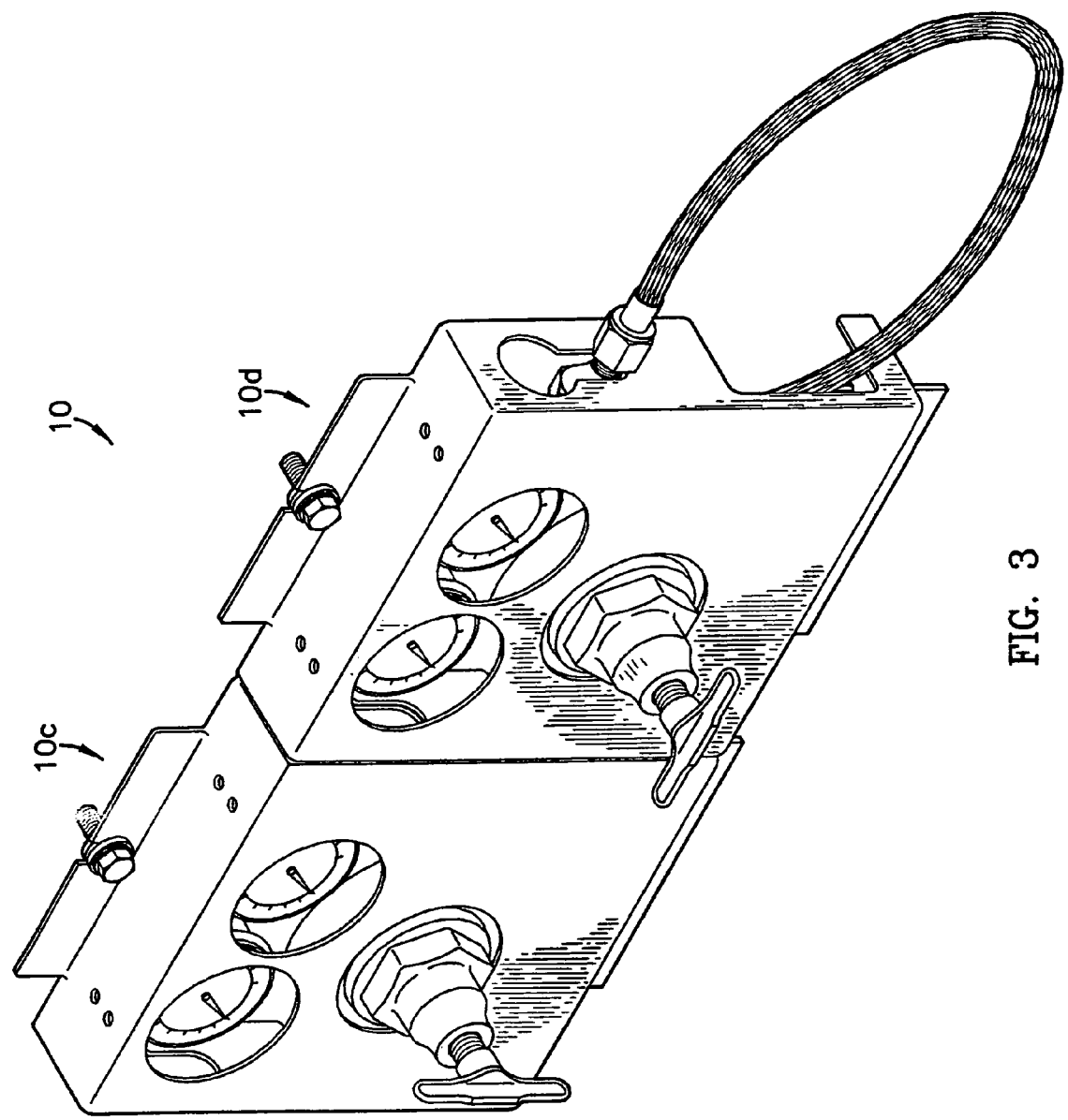
FIG. 3 is an isometric view of two instances of the housing mounted horizontally adjacent one another.

Referring particularly to FIG. 1, where it is desired to transport and use two or more gas supplies, two of the housings 10,10b each including its own instance of the regulator 12, a cylinder pressure gauge 14, and a working pressure gauge 16, are mounted on a vehicle. A first one of the housings 10 may, for example, be associated with regulating and monitoring a flow of oxygen from a first cylinder or other pressurized container, and a second one of the housings 10 may be associated with regulating and monitoring a flow of a fuel gas, such as, for example, acetylene, from a second cylinder or other pressurized container, wherein the oxygen and acetylene are used in combination for welding or cutting. Whereas the prior art required that each housing be separately mounted, thereby undesirably requiring a relatively large number of bolt holes or other fasteners, the housing 10 of the present invention is modular and vertically combinable with the one or more additional housings 10b to form a unit which is then mounted in the same manner and with the same number of bolt holes as a single housing. Alternatively, referring particularly to FIG. 3, the modular housings 10c,10d may be mounted horizontally adjacent one another, as necessary or desired.

From the preceding description, it can be appreciated that the housing of the present invention provides substantial advantages over the prior art, including, for example, that the housing is hingedly mounted so as to facilitate easier and more convenient access to the enclosed regulator and gauges without requiring that the housing be completely dismounted. Furthermore, the housing is advantageously modular, allowing multiple housings to be attached to one another to form an integral unit, with the unit, rather than the individual housings, being then mounted to the vehicle. Thus, if N number of bolts are required to mount a single housing, and it is desired to mount M number of housings, then the present invention continues to require only N number of bolts and bolt holes while the prior art requires (N×M) number of bolts and bolt holes. Thus, the present invention reduces the complexity of and labor involved in mounting multiple housings, and reduces the number of holes which must be provided in the mounting surface. Additionally, the shock-absorbing isolation mechanisms of the securement mechanism advantageously protect the regulator and gauges from exposure to potentially damaging or accuracy-affecting vibrations and impacts which might otherwise be transmitted via the housing.

Although the invention has been described with reference to the preferred embodiment illustrated in the attached drawings, it is noted that equivalents may be employed and substitutions made herein without departing from the scope of the invention as recited in the claims. Furthermore, applications are contemplated for the housing herein described that require only minor modifications to the device as disclosed. Thus, for example, alternative embodiments are contemplated wherein the bolt flange and the top bolt holes are associated with the left or right sides or with the bottom; the hinge and the bottom bolt holes are associated with the right or left side or with the top; or the hose openings and the keyhole slots are associated with the top or bottom. Furthermore, different materials or gauges of metal may be used, and any number of regulators or gauges, may be accommodated in a single housing by providing an equal number of holes in the front and an appropriate number of securement mechanisms. Additionally, while combining two housings to form a single unit is described herein as involving removal of the hinge of one of the housings, alternative embodiments are contemplated wherein the hinge may be welded to the housing and the bottom bolt holes provided through both the bottom and the permanently attached hinge such that the described process of coupling the two housings is accomplished without removing the hinge.

Having thus described the preferred embodiment of the invention, what is claimed as new and desired to be protected by Letters Patent includes the following:

What is claimed is:

1. A housing for securing to a mounting surface and protectively enclosing a regulator and a gauge associated with providing a flow of a gas from a gas supply, the housing comprising:
    an enclosure for defining a substantially enclosed area for encasing the regulator and the gauge;
    a hinge for pivotally securing the housing to the mounting surface; and
    an attachment component for selectively and removably securing the housing to a second housing, wherein when the housing is secured to the second housing the housing and the second housing form a unit that can be pivotably mounted upon the mounting surface using the hinge.

2. The housing as set forth in claim 1, further comprising a second attachment component for releasably securing the housing to the mounting surface, wherein when the attachment component is released the remainder of the housing can be pivoted as a unit upon the hinge and away from the mounting surface so as to expose and allow access to the regulator and the gauge.

3. The housing as set forth in claim 2, wherein the second attachment component includes a bolt flange operable to receive a bolt for securing the housing to the mounting surface.

4. The housing as set forth in claim 1, wherein a front of the enclosure presents a regulator hole corresponding to the regulator and a gauge hole corresponding to the gauge.

5. The housing as set forth in claim 1, further comprising a securement mechanism for securing the regulator and the gauge to the housing.

6. The housing as set forth in claim 5, wherein the securement mechanism includes a mounting plate for removably clamping the regulator and the gauge to a front of the enclosure.

7. The housing as set forth in claim 6, wherein the securement mechanism further includes
    a first isolation mechanism operable to be interposed between the front of the enclosure and the regulator and to dampen transmission of vibrations therebetween, and
    a second isolation mechanism operable to be interposed between the regulator and the mounting plate and to dampen transmission of vibrations therebetween.

8. The housing as set forth in claim 1, wherein a side of the enclosure presents a hose hole operable to allow a hose to pass therethrough.

9. The housing as set forth in claim 1, wherein the attachment component includes one or more bolt holes in a top of the enclosure operable to receive one or more bolts for securing the housing to the second housing.

10. The housing as set forth in claim 1, further including a keyhole slot having a larger upper hole overlapping a smaller lower hole, wherein the keyhole slot is operable to receive and retain a connector end of a hose.

11. A housing operable to secure to a mounting surface and to protectively enclose a regulator and one or more gauges associated with providing a flow of a gas from a gas supply, the housing comprising:
    a front presenting a regulator hole corresponding to the regulator and one or more gauge holes corresponding to the one or more gauges;
    a securement mechanism operable to removably couple the regulator with the housing, the securement mechanism including one or more isolation mechanisms operable to dampen transmission of vibrations to the regulator;
    a bolt flange operable to receive a bolt for securing the housing to the mounting surface; and
    a hinge operable to pivotably secure the housing to the mounting surface,
    wherein, when the bolt is removed from the bolt flange, the remainder of the housing can be pivoted as a unit upon the hinge and away from the mounting surface so as to expose and allow access to the regulator and the one or more gauges, and
    wherein, given an identical second housing having a second bolt flange and a second hinge, the housing and the second housing can be coupled to form a unit by removing the second hinge and bolting a bottom of the second housing to a top of the housing, wherein the unit can then be mounted upon the mounting surface using only the hinge and the second bolt flange.

12. The housing as set forth in claim 11, further including a keyhole slot having a larger upper hole overlapping a smaller lower hole, wherein the keyhole slot is operable to receive and retain a connector end of a hose.

13. The housing as set forth in claim 11, wherein the bolt flange is secured to a top of the housing.

14. The housing as set forth in claim 11, further comprising a securement mechanism for securing the regulator and the gauge to the front of the housing.

15. The housing as set forth in claim 14, wherein the securement mechanism includes a mounting plate for removably clamping the regulator to the front of the housing.

16. The housing as set forth in claim 15, wherein the securement mechanism further includes a first isolation mechanism operable to be interposed between the front of the enclosure and the regulator and to dampen transmission of vibrations therebetween.

17. The housing as set forth in claim 16, wherein the securement mechanism further includes a second isolation mechanism operable to be interposed between the regulator and the mounting plate and to dampen transmission of vibrations therebetween.

18. The housing as set forth in claim 11, wherein a side of the housing presents a hose hole operable to allow a hose to pass therethrough.

19. A housing for securing to a mounting surface and protectively enclosing a regulator and one or more gauges associated with providing a flow of a gas from a gas supply, the housing comprising:
    a plurality of walls for defining a substantially enclosed area for encasing the regulator and the one or more gauges;
    a hinge secured to a bottom wall of the plurality of walls, wherein the hinge pivotably secures the bottom wall to the mounting surface;
    a bolt flange on a top wall of the plurality of walls, wherein the bolt flange receives a bolt and secures the top to the mounting surface so that when the bolt is removed from the flange the remainder of the housing can be pivoted as a unit upon the hinge and away from the mounting surface so as to expose and allow access to the regulator and the one or more gauges; and one or more top bolt holes for selectively and removably securing a top of the housing to a bottom of a second housing, wherein the housing and the second housing form a unit that can be pivotally mounted upon the mounting surface using the hinge.

\* \* \* \* \*